(12) United States Patent
Sejalon

(10) Patent No.: US 10,046,604 B2
(45) Date of Patent: Aug. 14, 2018

(54) TIRE CROWN FOR HEAVY CIVIL ENGINEERING VEHICLE

(71) Applicants:COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Olivier Sejalon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 275 days.

(21) Appl. No.: 14/654,730

(22) PCT Filed: Dec. 18, 2013

(86) PCT No.: PCT/EP2013/077027
§ 371 (c)(1),
(2) Date: Jun. 22, 2015

(87) PCT Pub. No.: WO2014/095957
PCT Pub. Date: Jun. 26, 2014

(65) Prior Publication Data
US 2015/0314648 A1     Nov. 5, 2015

(30) Foreign Application Priority Data

Dec. 20, 2012 (FR) ...................................... 12 62424

(51) Int. Cl.
*B60C 9/20* (2006.01)
*B60C 5/00* (2006.01)
*B60C 9/28* (2006.01)

(52) U.S. Cl.
CPC .................. *B60C 9/20* (2013.01); *B60C 5/00* (2013.01); *B60C 9/28* (2013.01); *B60C 9/2006* (2013.01);
(Continued)

(58) Field of Classification Search
CPC ..... B60C 9/20; B60C 9/28; B60C 2009/2016; B60C 2009/2019; B60C 2009/2022; B60C 2200/06
See application file for complete search history.

(56) References Cited

U.S. PATENT DOCUMENTS 3,677,319 A  *  7/1972  Mirtain ................. B60C 9/2009
                                                                 152/527
3,783,925 A  *  1/1974  Boileau .................... B60C 9/07
                                                                 152/556
(Continued)

FOREIGN PATENT DOCUMENTS

CA          1209022       8/1986
CN          1350495       5/2002
(Continued)

*Primary Examiner* — Jacob T Minskey
*Assistant Examiner* — Cedrick S Williams
(74) *Attorney, Agent, or Firm* — Cozen O'Connor

(57) ABSTRACT

Crown of a radial tire for a heavy civil engineering vehicle comprises a tread, a crown reinforcement radially inside of the tread, and a carcass reinforcement radially inside of the crown reinforcement. The crown reinforcement comprises, radially from the outside towards the inside, a protective reinforcement comprising two protective layers comprising elastic metal reinforcers which are parallel to one another within each layer and crossed from one layer to the next, forming respective angles $A_1$ and $A_2$ with the circumferential direction and a working reinforcement comprising two working layers comprising inelastic metal reinforcers, parallel to one another within each layer and crossed from one layer to the next, forming respective angles $B_1$ and $B_2$ with (Continued)

the circumferential direction. Angle $B_1$ is at least equal to 50° and strictly less than 90° and angle $B_2$ is non-zero and at most equal to 12°.

13 Claims, 2 Drawing Sheets

(52) U.S. Cl.
CPC ............... *B60C 2009/2016* (2013.01); *B60C 2009/2019* (2013.01); *B60C 2009/2022* (2013.01); *B60C 2200/06* (2013.01); *Y10T 152/10765* (2015.01)

(56) References Cited

U.S. PATENT DOCUMENTS

| | | | |
|---|---|---|---|
| 5,843,583 A | 12/1998 | D'Haene | |
| 8,166,741 B2 * | 5/2012 | Barguet | D02G 3/48 |
| | | | 57/216 |
| 9,315,073 B2 * | 4/2016 | Viller | B60C 9/0238 |
| 2002/0033213 A1 | 3/2002 | Cluzel | |
| 2005/0241742 A1 * | 11/2005 | Tsuruta | B60C 9/20 |
| | | | 152/527 |
| 2009/0288752 A1 * | 11/2009 | El-Berrichi | B60C 9/2006 |
| | | | 152/548 |
| 2009/0294009 A1 | 12/2009 | Barguet et al. | |
| 2010/0065182 A1 * | 3/2010 | Bondu | B60C 9/20 |
| | | | 152/535 |
| 2011/0192513 A1 * | 8/2011 | Hamada | B60C 3/04 |
| | | | 152/209.18 |

FOREIGN PATENT DOCUMENTS

| | | | |
|---|---|---|---|
| CN | 101531121 | 9/2009 | |
| CN | 101588932 | 11/2009 | |
| CN | 101801685 | 8/2010 | |
| CN | 102656025 | 9/2012 | |
| DE | 10 2006 029 898 | 1/2008 | |
| EP | 2 106 930 | 10/2009 | |
| FR | 2 566 334 | 12/1985 | |
| WO | WO 2005/014925 | 2/2005 | |
| WO | WO 2007/090603 | 8/2007 | |
| WO | WO 2011/070111 | 6/2011 | |
| WO | WO 2011070111 A1 * | 6/2011 | ........... B60C 9/1821 |
| WO | WO-2011070111 A1 * | 6/2011 | ........... B60C 9/1821 |

* cited by examiner

US 10,046,604 B2

TIRE CROWN FOR HEAVY CIVIL ENGINEERING VEHICLE

RELATED APPLICATIONS

This is a U.S. National Phase Application under 35 USC 371 of International Application PCT/EP2013/077027 filed on Dec. 18, 2013.

This application claims the priority of French application no. 1262424 filed Dec. 20, 2012, the entire content of which is hereby incorporated by reference.

FIELD OF THE INVENTION

The present invention relates to a radial tire intended to be fitted to a heavy civil engineering vehicle and, more particularly, relates to the crown of such a tire.

Although not necessarily restricted to this type of application, the invention is more particularly described in the case of a large-sized radial tire intended to be mounted on a dumper, a vehicle for transporting materials extracted from quarries or surface mines. A large-sized tire means a tire intended to be mounted on a rim of which the nominal diameter, within the meaning of the European Tire and Rim Technical Organisation or ETRTO standard is at least 25 inches.

BACKGROUND OF THE INVENTION

A dumper is intended to run over site or mine paths or roads that are somewhat twisty and partially covered with stones of various sizes. In use, the tires of a dumper are subject on the one hand to the mechanical loadings of running and, on the other hand, to the mechanical loadings generated by the stones spread over the road. Amongst the mechanical loadings of running the transverse loadings resulting from a somewhat twisty journey, are particularly significant to such a tire and require the tire to be able to generate sufficient transverse thrust. Furthermore, the mechanical loadings generated by the stones create impacts on the crown of the tire which are liable to damage the tire: the crown of the tire has therefore to be capable of absorbing these impacts.

A tire comprises a crown intended to come into contact with the ground via a tread. This crown is connected by two side walls to two beads which are intended to provide the mechanical connection between the tire and the rim on which it is mounted.

Because a tire has a geometry exhibiting symmetry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane.

In what follows, the expressions "radially on the inside of or, as the case may be, radially on the outside of" mean "closer to or, as the case may be, further away from, the axis of rotation of the tire". "Axially on the inside of or, as the case may be, axially on the outside of" mean "closer to or, as the case may be, further away from, the equatorial plane of the tire", the equatorial plane of the tire being the plane passing through the middle of the tread of the tire and perpendicular to the axis of rotation of the tire.

A radial tire comprises a reinforcement consisting of a crown reinforcement radially on the inside of the tread, and of a carcass reinforcement radially on the inside of the crown reinforcement.

The carcass reinforcement of a radial tire for a heavy vehicle of the civil engineering type usually comprises at least one carcass layer made up of generally metal reinforcers coated in an elastomeric coating material or coating compound. In the field of tires, an elastomeric material obtained by blending components of the material is usually referred to as a compound. The carcass layer comprises a main part, connecting the two beads of the tire to one another and wound, within each bead, from the inside towards the outside of the tire, around a generally metal circumferential reinforcing element referred to as a bead wire to form a turnup. The metal reinforcers of a carcass layer are substantially parallel to one another and make with the circumferential direction an angle of between 85° and 95°.

The crown reinforcement of a radial tire for a heavy vehicle of the civil engineering type comprises a superposition of crown layers arranged circumferentially and radially on the outside of the carcass reinforcement. Each crown layer is made up of generally metal reinforcers which are parallel to one another and coated in an elastomer coating material or coating compound.

Among the crown layers, a distinction is usually made between the protective layers, which make up the protective reinforcement and are radially furthest towards the outside, and the working layers, which make up the working reinforcement and lie radially between the protective reinforcement and the carcass reinforcement.

The protective reinforcement, made up of at least one protective layer, essentially protects the working layers from mechanical or physico-chemical attack likely to spread through the tread radially towards the inside of the tire.

In the case of a tire for a dumper, the protective reinforcement often comprises two radially superposed and adjacent protective layers. Each protective layer comprises elastic metal reinforcers which are parallel to one another and form with the circumferential direction an angle generally of between 15° and 35° and preferably of between 20° and 30°. The metal reinforcers of the protective layers are usually crossed from one protective layer to the next.

The working reinforcement, made up of at least two working layers, has the function of hooping the tire and of providing the tire with stiffness and road holding. It absorbs both the mechanical loadings of inflation, which are generated by the pressure to which the tire is inflated and transmitted via the carcass reinforcement, and the mechanical loadings of running, which are generated by the running of the tire on the ground and transmitted by the tread. It needs also to withstand oxidation and impact and puncturing, by virtue of its own intrinsic design and that of the protective reinforcement.

In the case of a tire for a dumper, the working reinforcement usually comprises two radially superposed and adjacent working layers. Each working layer comprises inelastic metal reinforcers which are parallel to one another and form with the circumferential direction an angle generally of between 15° and 45°. The metal reinforcers of the working layers are usually crossed from one working layer to the next.

Furthermore, in the case of a tire for a dumper comprising a working reinforcement with two working layers, the angle referred to as the equilibrium angle of the working reinforcement, which is defined such that the square of the tangent of the equilibrium angle is equal to the product of the tangents of the respective angles of the reinforcers of each working layer, is at most equal to 45°. In other words, the equilibrium angle is the angle formed by the metal reinforcers of each of the two working layers of a working reinforcement mechanically equivalent to the reference working reinforcement. This equilibrium angle criterion embodies the fact that the axial or transverse stiffness of the working reinforcement, namely the axial force that has to be applied to the working reinforcement in order to obtain an axial movement of 1 mm, is somewhat high.

As far as characterizing metal reinforcers is concerned, a metal reinforcer is mechanically characterized by a curve representing the tensile force (in N) applied to the metal reinforcer, as a function of the relative elongation (in %) of the metal reinforcer, referred to as a force-elongation curve. Mechanical characteristics in tension such as the structural elongation $A_s$ (in %), the total elongation at break $A_t$ (in %), the force at break $F_m$ (maximum load in N) and the breaking strength $R_m$ (in MPa), are deduced from this force-elongation curve, these characteristics being measured in accordance with the 1984 Standard ISO 6892.

The total elongation at break $A_t$ of the metal reinforcer is, by definition, the sum of the structural, elastic and plastic elongations thereof ($A_t=A_s+A_e+A_p$). The structural elongation $A_s$ results from the relative positioning of the metal threads that make up the metal reinforcer under a low tensile force. The elastic elongation $A_e$ is the result of the very elasticity of the metal of the metal threads of which the metal reinforcer is made up, considered individually (Hooke's law). The plastic elongation $A_p$ results from the plasticity (irreversible deformation beyond the elastic limit) of the metal of these metal threads considered individually. These various elongations and the respective significance thereof, which are well known to those skilled in the art, are described for example in documents U.S. Pat. No. 5,843, 583, WO2005/014925 and WO2007/090603.

An extension modulus (in GPa) is also defined at every point of the force/elongation curve and represents the gradient of the straight line tangential to the force-elongation curve at this point. In particular, the tensile elastic modulus or Young's modulus is the name given to the tensile modulus of the elastic linear part of the force-elongation curve.

Among the metal reinforcers a distinction is usually made between elastic metal reinforcers such as those used in the protective layers and inelastic metal reinforcers such as those used in the working layers.

An elastic metal reinforcer is characterized by a structural elongation $A_s$ at least equal to 1% and a total elongation at break $A_t$ at least equal to 4%. Furthermore, an elastic metal reinforcer has a tensile elastic modulus at most equal to 150 GPa and usually of between 40 GPa and 150 GPa.

An inelastic metal reinforcer is characterized by a relative elongation, under a tensile force equal to 10% of the breaking force $F_m$, at most equal to 0.2%. Moreover, an inelastic metal reinforcer has a tensile elastic modulus usually of between 150 GPa and 200 GPa.

Under the effect of the mechanical loadings generated by the stones present on the ground or impacts, the abovementioned crown reinforcement comprising a protective reinforcement comprising at least two protective layers and a working reinforcement comprising at least two working layers may experience a partial or even total breakage. In practice, the crown layers each yield in turn, from the radially outermost crown layer to the radially innermost crown layer.

In order to characterize the breaking strength of a tire crown reinforcement subjected to impacts, the person skilled in the art knows to carry out tests that involve running a tire, inflated to a recommended pressure and subject to a recommended load over a cylindrical indenter or obstacle of a diameter of between 1 inch, namely 25.4 mm, and 2.2 inches, namely 55.9 mm, according to the size of the tire, and of a set height. The breaking strength is characterized by the critical height of the indenting tool, namely the maximum height of the indenting tool that causes complete breakage of the crown reinforcement, namely that causes all the crown layers to break.

SUMMARY OF THE INVENTION

One object of the invention is to make the crown reinforcement of a radial tire for a heavy vehicle of the civil engineering type less sensitive to the mechanical loadings generated by stones present on the ground.

This objective has been achieved, according to one aspect of the invention, by a tire for a heavy vehicle of the civil engineering type, comprising:

a tread, a crown reinforcement radially on the inside of the tread, and a carcass reinforcement radially on the inside of the crown reinforcement, the crown reinforcement comprising, radially from the outside towards the inside, a protective reinforcement comprising a first protective layer and a second protective layer, radially on the outside of and adjacent to the first protective layer, the first and second protective layers comprising elastic metal reinforcers which are parallel to one another within each layer and crossed from one layer to the next, forming respective angles A1 and A2 with the circumferential direction, a working reinforcement comprising a first working layer and a second working layer, radially on the outside of and adjacent to the first working layer, the first and second working layers comprising inelastic metal reinforcers, parallel to one another within each layer and crossed from one layer to the next, forming respective angles B1 and B2 with the circumferential direction, the angle B1, formed with the circumferential direction by the metal reinforcers of the first working layer, being at least equal to 50° and strictly less than 90° and the angle B2, formed with the circumferential direction by the metal reinforcers of the second working layer being non zero and at most equal to 12°.

In the prior art, each working layer comprises inelastic metal reinforcers parallel to one another and forming with the circumferential direction an angle generally of between 15° and 45°. The working reinforcement according to the invention therefore differs in that the angle $B_1$, formed with the circumferential direction by the metal reinforcers of the first working layer, is at least equal to 50°, namely higher than the maximum value of 40°, and in that the angle $B_2$, formed with the circumferential direction by the metal reinforcers of the second working layer is at most equal to 12°, namely lower than the minimum value of 15°. It should be noted that the extreme angle values of 90°, for the angle $B_1$ metal reinforcers of the first working layer, and of 0°, for the angle $B_2$ metal reinforcers of the second working layer, are excluded from the invention.

The difference between the angles $B_1$ and $B_2$ of the metal reinforcers of the first and second working layers respectively, or more precisely between their absolute values, is at least 37°. The equilibrium angle B defined previously, satisfying $(\tan B)^2=(\tan B_1)*(\tan B_2)$, is at most equal to 45° as in the prior art, which means to say that the overall mechanical behaviour of the working reinforcement, under the mechanical loadings of running, is equivalent to that of the working reinforcement of the tire of the prior art considered as reference.

With respect to the mechanical loadings generated by the stones, namely obstacles, the breaking strength of the working reinforcement is significantly improved. The critical height of the indenting tool that causes complete breakage of the working reinforcement according to the invention is at least equal to 1.2 times the critical height of the indenting tool that leads to complete breakage of the working reinforcement of the prior art considered as reference. In other words, the breaking strength of the working reinforcement is increased by at least 20%.

For preference, the angle $B_1$, formed with the circumferential direction by the metal reinforcers of the first working layer is at least equal to 60°: this further increases the breaking strength of the working reinforcement.

For preference also, the angle $B_2$, formed with the circumferential direction by the metal reinforcers of the second working layer, is at most equal to 10°: this also contributes to increasing the breaking strength of the working reinforcement.

The angles $A_1$ and $A_2$, formed with the circumferential direction by the metal reinforcers of the first and second protective layers respectively, are at least equal to 70° and strictly less than 90°. This range of angles for the protective layers makes it possible to increase the breaking strength the protective reinforcement by the order of 10%. In combination with the working layers described previously, the improvement in breaking strength of the working reinforcement may then reach as high as at least 35%.

The angles $A_1$ and $A_2$, formed with the circumferential direction by the metal reinforcers of the first and second protective layers respectively, are advantageously at least equal to 80° and strictly less than 90°. The aforementioned technical effect is thus further amplified.

The angles $A_1$ and $A_2$, formed with the circumferential direction by the metal reinforcers of the first and second protective layers respectively are preferably equal to one another in terms of absolute value.

It is advantageous for the first protective layer to be radially on the outside of and adjacent to the second working layer. Adjacent means a layer in direct contact with the next, which means to say which is not separated from the next one by an interposed component such as, for example, a layer of elastomeric compound. This proximity of the two, respectively protective and working, layers guarantees mechanical coupling between the working reinforcement and the protective reinforcement.

The metal reinforcers of the first protective layer are also advantageously crossed with respect to the metal reinforcers of the second working layer. The crossing between the respective reinforcers of the first protective layer and of the second working layer also improves the mechanical operation of the crown reinforcement.

For the largest sizes of tire which are intended to be fitted on a rim with a nominal diameter of at least 49 inches, the crown reinforcement furthermore and usually comprises, radially on the inside of the working reinforcement, an additional reinforcement comprising a first additional layer and a second additional layer, radially on the outside of and adjacent to the first additional layer, the first and second additional layers comprising inelastic metal reinforcers which are parallel to one another within each layer and crossed from one layer to the next, forming respective angles $C_1$ and $C_2$ at most equal to 15° with the circumferential direction. This additional reinforcement has a hooping function, which means to say that it limits the radial movements of the carcass reinforcement as the tire is being inflated.

The angles $C_1$ and $C_2$, formed with the circumferential direction by the metal reinforcers of the first and second additional layer respectively are preferably at most equal to 12°. The smaller these angles are, the greater the hooping effect of the carcass reinforcement and the greater the extent to which the mechanical loadings at the ends of the working layers are reduced.

The angles $C_1$ and $C_2$, formed with the circumferential direction by the metal reinforcers of the first and second additional layer respectively are even more preferably equal to one another in terms of absolute value.

With the tread and the protective reinforcement having respective axial widths $L_2$ and $L_5$, the axial width $L_5$ of the protective reinforcement is at least equal to 0.85 times and at most equal to the axial width $L_2$ of the tread. The axial width of the tread means the axial distance between the projections of the ends of the tread onto an axial straight line, namely a straight line parallel to the axis of rotation of the tire. The axial width of the protective reinforcement means the axial width the axially widest protective layer, namely the axial distance between the projections of the ends of the said protective layer onto an axial straight line.

In a tire according to an embodiment of the invention, the axially widest protective layer is generally the first protective layer radially furthest towards the inside of the protective reinforcement. The second protective layer is axially narrower with an axial width of between 0.6 times and 0.75 times the axial width L2 of the tread. In such a design, the protective layer is said to overhang because it is wider than the first working layer: this makes it possible to reduce the risk of detachment of the ends of the first working layer under the effect of repeated impacts on the tread. The second protective layer is narrower with a view to being confined to protecting the working reinforcement in the median portion most heavily loaded by the impacts on the tread.

With the tread and the working reinforcement having respective axial widths $L_2$ and $L_6$, the axial width $L_6$ of the working reinforcement is at least equal to 0.7 times and at most equal to 0.9 times the axial width $L_2$ of the tread. Like with the protective reinforcement, the axial width of the working reinforcement is the axial width of the axially widest working layer, namely the axial distance between the projections of the ends of the said working layer onto an axial straight line.

In a tire according to an embodiment of the invention, the axially widest working layer is generally the first working layer radially furthest towards the inside of the working reinforcement. The second working layer is axially narrower with an axial width of between 0.65 times and 0.8 times the axial width L2 of the tread. Such a design of working reinforcement results from a compromise between the objectives of reinforcement and of endurance of the working reinforcement.

With the tread and the additional reinforcement having respective axial widths $L_2$ and $L_7$, the axial width $L_7$ of the additional reinforcement is at least equal 0.35 times and at most equal to 0.5 times the axial width $L_2$ of the tread. The axial width of the additional reinforcement means the axial width of the axially widest additional layer, namely the axial distance between the projections of the ends of the said additional layer onto an axial straight line.

In a tire according to an embodiment of the invention, the axially widest additional layer is generally the first additional layer, radially furthest towards the inside of the additional reinforcement. The second additional layer is axially narrower with an axial width of between 0.3 times and 0.45 times the axial width L2 of the tread. Such a design of the additional reinforcement makes it possible to limit the radial deformation of the carcass reinforcement essentially in its median portion, or in other words to limit the hooping function of the additional reinforcement to the median portion of the tire.

BRIEF DESCRIPTION OF THE DRAWINGS

Figure 1:
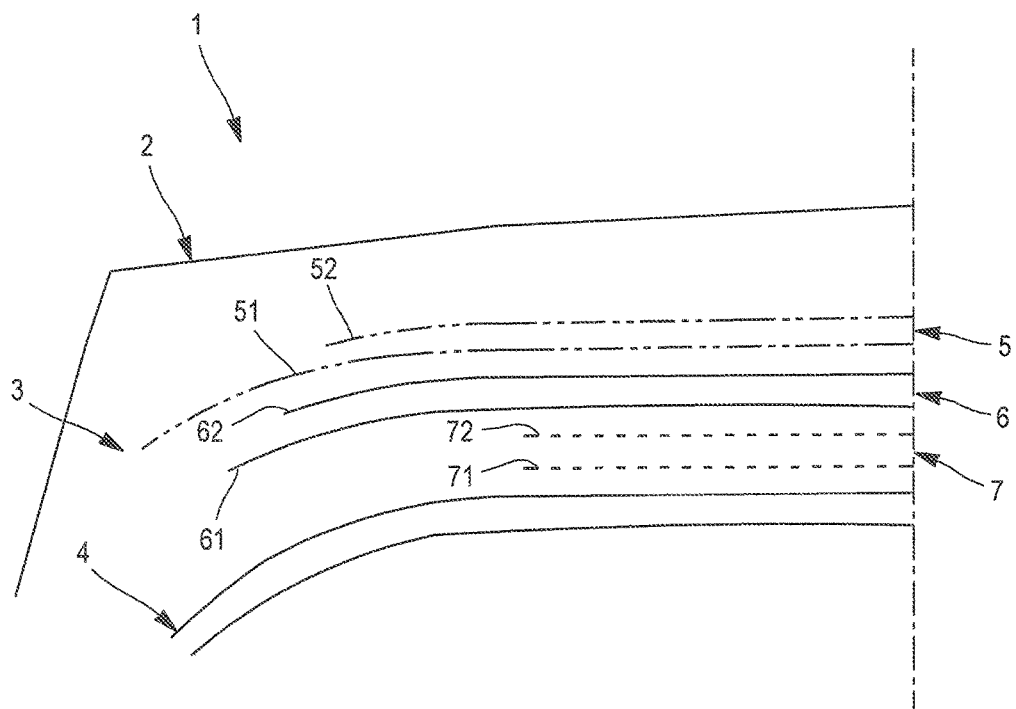
FIG. 1 shows, in a simplified view not drawn to scale, a half section, in the meridian plane, of a crown of a tire for a heavy vehicle of the civil engineering type according to an embodiment of the invention.

FIG. 1 depicts a meridian half section of the crown of a tire 1 for a heavy vehicle of the civil engineering type comprising a tread 2, a crown reinforcement 3 radially on the inside of the tread 2 and a carcass reinforcement 4 radially on the inside of the crown reinforcement 3. The crown reinforcement 3 comprises, radially from the outside inwards, a protective reinforcement 5 comprising a first protective layer 51 and a second protective layer 52 radially on the outside of and adjacent to the first protective layer 51, a working reinforcement 6 comprising a first working layer 61 and a second working layer 62 radially on the outside of and adjacent to the first working layer 61, and an additional reinforcement 7 comprising a first additional layer 71 and a second additional layer 72 radially on the outside of and adjacent to the first additional layer 71.

Figure 2:
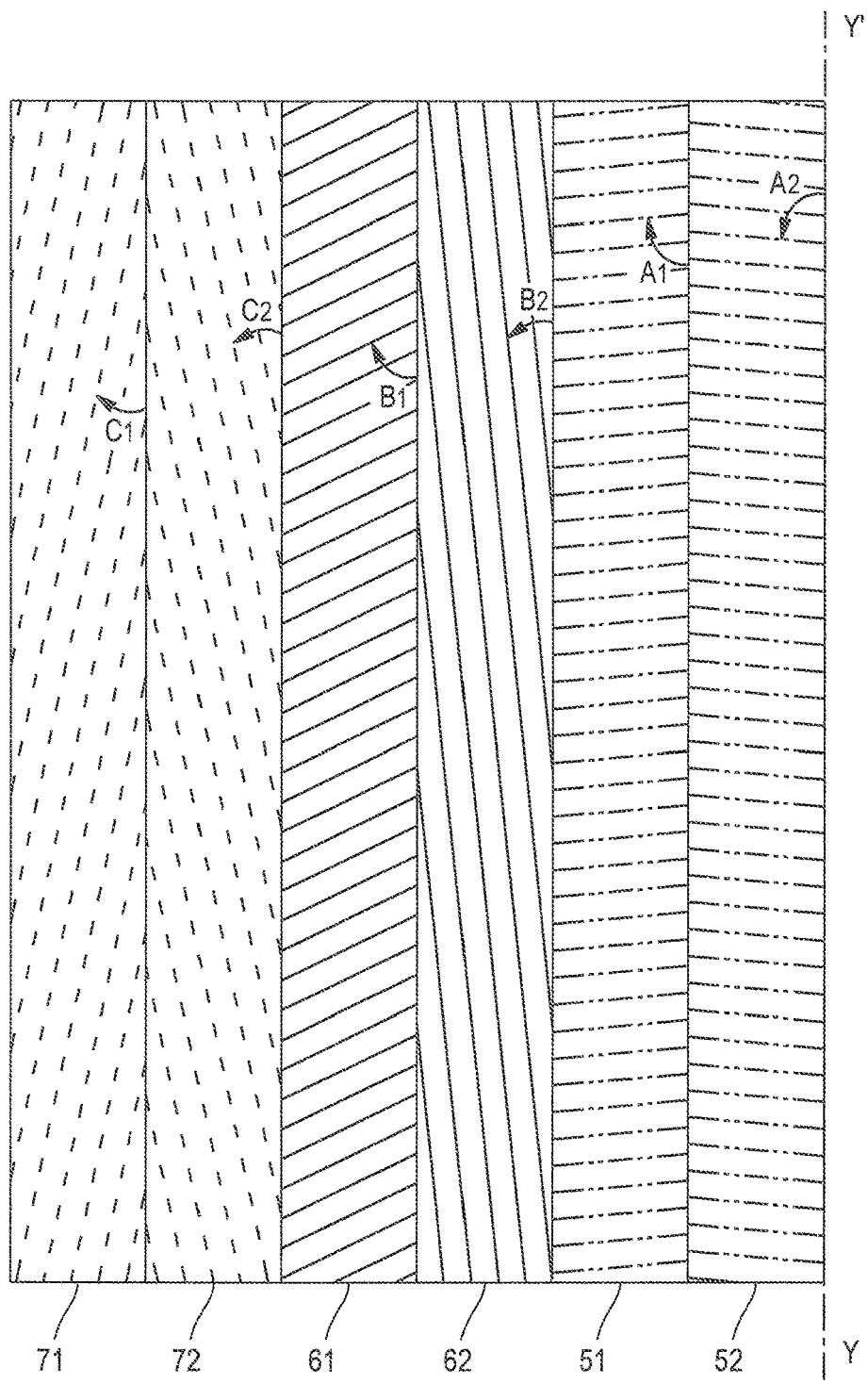
FIG. 2 shows a plane view from above of the crown reinforcement of a tire according to an embodiment of the invention, the crown layers being cut away to show the angles of the reinforcers of the various layers that make up the crown reinforcement.

FIG. 2 depicts a plan view from above of a crown reinforcement of a tire 1 for a heavy vehicle of the civil engineering type according to the invention. The layers of the crown reinforcement have been cut to show all the crown layers and the respective angles formed by the reinforcers thereof with the circumferential direction (YY'). The protective reinforcement is made up of two protective layers (51, 52) of which the metal reinforcers, which are parallel to one another within one and the same layer, form, with the circumferential direction (YY'), respective angles $A_1$ and $A_2$ which are equal to one another and at least equal to 80° and strictly less than 90°. The working reinforcement is made up of two working layers (61, 62) of which the metal reinforcers, which are parallel to one another between one same layer, form, with the circumferential direction (YY'), angles $B_1$ and $B_2$ respectively at least equal to 60° and at most equal to 10°. Finally, the additional reinforcement is made up of two additional layers (71, 72) of which the metal reinforcers, which are parallel to one another within one same layer, make, with the circumferential direction (YY'), respective angles $C_1$ and $C_2$ which are equal to one another and at most equal to 12°.

The invention has been studied more particularly for the case of tires of size 53/80R63 and 24/85R35 with reference to a tire of the prior art.

The crown reinforcement of the tire according to the invention comprises, radially from the outside towards the inside:

a protective reinforcement comprising a first and a second protective layer of which the respective elastic metal reinforcers form with the circumferential direction angles $A_1$ and $A_2$ of +85° and −85° respectively, a working reinforcement comprising a first and a second working layer of which the respective inelastic metal reinforcers form with the circumferential direction angles $B_1$ and $B_2$ of +64° and −6° respectively, corresponding to an equivalent angle of 25°, an additional reinforcement comprising a first and a second additional layer, of which the respective inelastic metal reinforcers form with the circumferential direction angles $C_1$ and $C_2$ of +8° and −8° respectively.

The crown reinforcement of the tire of the prior art comprises, radially from the outside inwards:

a protective reinforcement comprising a first and a second protective layer of which the respective elastic metal reinforcers form with the circumferential direction angles $A_1$ and $A_2$ of +25° and −25° respectively, a working reinforcement comprising a first and a second working layer of which the respective inelastic metal reinforcers form with the circumferential direction angles $B_1$ and $B_2$ of +33° and −19° respectively, corresponding to an equivalent angle of 25°, an additional reinforcement comprising a first and a second additional layer, the respective inelastic metal reinforcers of which make with the circumferential direction angles $C_1$ and $C_2$ of +8° and −8° respectively.

In the case of a tire of size 24/85R35, the crown puncturing tests using a cylindrical indenting tool with a diameter of 1.2 inches, namely 30.5 mm, showed a 29% improvement in overall breaking strength of the crown for a tire according to the invention as compared with a tire of the prior art.

The invention is not restricted to the features described hereinabove and may be extended to other embodiments such as, for example and nonlimitingly:

a working reinforcement in which the optimum ranges of angles of the first and second working layers are interchanged, a protective reinforcement the protective layers of which have respective reinforcers which form, with the circumferential direction, respective angles $A_1$ and $A_2$ at most equal to 10° corresponding to another optimum of the crown reinforcement with a view to solving the targeted technical problem.

The invention claimed is:

1. A tire for a heavy vehicle of the civil engineering type, comprising:
a tread,
a crown reinforcement radially on the inside of the tread, and
a carcass reinforcement radially on the inside of the crown reinforcement,
the crown reinforcement comprising, radially from the outside towards the inside,
a protective reinforcement comprising a first protective layer and a second protective layer, radially on the outside of and adjacent to the first protective layer, the first and second protective layers comprising elastic metal reinforcers, having a structural elongation As at least equal to 1% and a total elongation at break At least equal to 4% and a tensile elastic modulus at most equal to 150 GPa, which are parallel to one another within each layer and crossed from one layer to the next, forming respective angles $A_1$ and $A_2$ with the circumferential direction, and
a working reinforcement comprising a first working layer and a second working layer, radially on the outside of and adjacent to the first working layer, the first and second working layers comprising inelastic metal reinforcers, having a relative elongation, under a tensile force equal to 10% of a breaking force Fm, at most equal to 0.2% and a tensile elastic modulus of between 150 GPa and 200 GPa, parallel to one another within each layer and crossed from one layer to the next, forming respective angles $B_1$ and $B_2$ with the circumferential direction, wherein the working reinforcement comprising the first working layer and the second working layer are axially continuous, wherein the angle $B_1$ formed with the circumferential direction by the metal reinforcers of the first working layer is at least equal to 50° and less than 90° and wherein the angle $B_2$ formed with the circumferential direction by the metal reinforcers of the second working layer is non-zero and at most equal to 12°, and wherein a difference between an absolute value of the angle Bi formed with the circumferential direction by the metal reinforcers of the first working layer and an absolute value of the angle $B_2$ formed with the circumferential direction by the metal reinforcers of the second working layer is at least 37°, wherein the crown reinforcement comprises, radially on the inside of the working reinforcement, an additional reinforcement comprising a first additional layer and a second additional layer, radially on the outside of and adjacent to the first additional layer, the first and second additional layers comprising inelastic metal reinforcers which are parallel to one another within each layer and crossed from one layer to the next, forming respective angles C1 and C2 at most equal to 15° with the circumferential direction.

2. The tire for a heavy vehicle of the civil engineering type according to claim 1, wherein the angle $B_1$ formed with the circumferential direction by the metal reinforcers of the first working layer is at least equal to 60°.

3. The tire for a heavy vehicle of the civil engineering type according to claim 1, wherein the angle $B_2$ formed with the circumferential direction by the metal reinforcers of the second working layer is at most equal to 10°.

4. The tire for a heavy vehicle of the civil engineering type according to claim 1, wherein the angles $A_1$ and $A_2$ formed with the circumferential direction by the metal reinforcers of the first and second protective layers are at least equal to 70° and less than 90°.

5. The tire for a heavy vehicle of the civil engineering type according to claim 1, wherein the angles $A_1$ and $A_2$ formed with the circumferential direction by the metal reinforcers of the first and second protective layers are at least equal to 80° and less than 90°.

6. The tire for a heavy vehicle of the civil engineering type according to claim 1, wherein the angles $A_1$ and $A_2$ formed with the circumferential direction by the metal reinforcers of the first and second protective layers are equal to one another in terms of absolute value.

7. The tire for a heavy vehicle of the engineering type according to claim 1, wherein the first protective layer is radially on the outside of and adjacent to the second working layer.

8. The tire for a heavy vehicle of the civil engineering type according to claim 1, wherein the metal reinforcers of the first protective layer are crossed with respect to the metal reinforcers of the second working layer.

9. The tire for a heavy vehicle of the civil engineering type according to claim 1, wherein the angles $C_1$ and $C_2$ formed with the circumferential direction by the metal reinforcers of the first and second additional layer are at most equal to 12°.

10. The tire for a heavy vehicle of the civil engineering type according to claim 1, wherein the angles $C_1$ and $C_2$ formed with the circumferential direction by the metal reinforcers of the first and second additional layer are equal to one another in terms of absolute value.

11. The tire for a heavy vehicle of the civil engineering type according to claim 1, wherein the axial width of the protective reinforcement is at least equal to 0.85 times and at most equal to the axial width of the tread.

12. The tire for a heavy vehicle of the civil engineering type according to claim 1, wherein the axial width of the working reinforcement is at least equal to 0.7 times and at most equal to 0.9 times the axial width of the tread.

13. The tire for a heavy vehicle of the civil engineering type according to claim 1, wherein the axial width of the additional reinforcement is at least equal 0.35 times and at most equal to 0.5 times the axial width of the tread.

* * * * *